Oct. 30, 1956   F. L. WARD   2,769,071
BRIDGE BALANCING DEVICES
Filed April 10, 1953

INVENTOR.
Frank L. Ward
BY Kenway, Jenney, Witter
& Hildreth

ATTORNEYS

United States Patent Office 2,769,071
Patented Oct. 30, 1956

2,769,071

BRIDGE BALANCING DEVICES

Frank L. Ward, Natick, Mass.

Application April 10, 1953, Serial No. 347,988

5 Claims. (Cl. 201—54)

The present invention relates to bridge balancing devices for control systems and more particularly to leading or follow-up elements to effect a rebalance of the bridge after it has become unbalanced.

An example of the use of the present invention is as follows: In a temperature control system having a temperature sensing element which forms one arm of the bridge, two of the balance arms may comprise temperature sensitive resistors or thermistors. Upon a sufficient change in the sensing element to effect unbalance of the bridge a signal is sent through an amplifier to operate an actuator which controls the supply of heat to the system. At the same time a heating element is energized to apply heat to one of the thermistors and thus bring about a rebalance of the bridge. The time required to run through a complete cycle is a function, among other things, of the time constant of the thermal elements. Such a cycle is called a pulse and the assembly of thermistors and thermal elements is called a pulsing element since it controls the supply of pulses of heat to the system.

In many cases the time of a cycle or pulse is found to be too long. If a shortened pulse time is required, it does not suffice to increase the heater power, since while that will shorten the time to rebalance of the bridge, it lengthens the cool-off time of the thermistor, which cool-off time is a necessary part of the complete cycle of operation.

According to the present invention, the two temperature-sensitive resistance elements (thermistors) and the two thermal elements are mounted side by side in an assembly wherein thermal conduction may occur from one thermistor to the other. This does not change the heat-up or rebalance time, but it, in effect, shortens the complete pulse time by tending to bring the thermistors quickly to a thermal balance whereby a new cycle may be rapidly initiated if necessary.

In the accompanying drawings.

Figure 1:
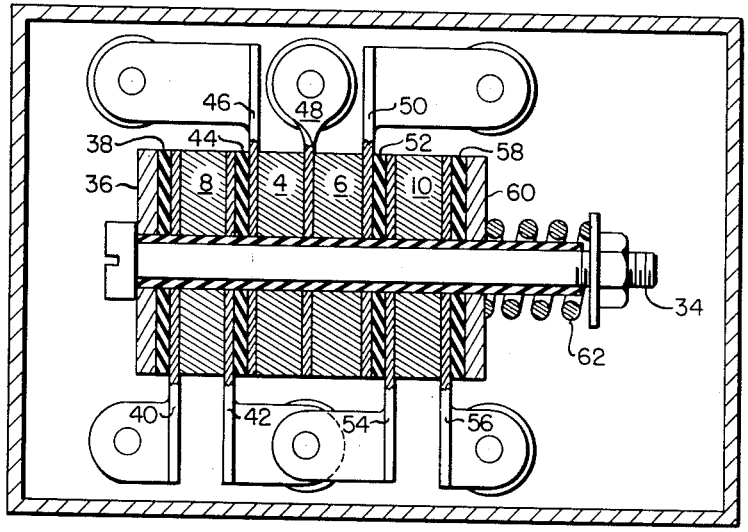
Fig. 1 is a sectional elevation on a large scale of the preferred form of pulsing element assembly according to the present invention.

The illustrated embodiment of the invention comprises a pulsing element or bridge balance assembly having two temperature-sensitive elements 4 and 6, that is, elements having a temperature coefficient of resistance. Preferably the elements are thermistors shown in Fig 2 as being in two adjacent arms of a bridge. Adjacent to each thermistor is a thermal element, said elements being indicated at 8 and 10. The four elements 4, 6, 8 and 10 are mounted in a manner to be presently described in detail. The thermal elements 8 and 10 may be any suitable resistors, but for convenience in manufacture and assembly, are preferably identical with the thermistors 4 and 6, all of which are of the familiar type, having a negative temperature coefficient of resistance.

Before describing the unit further, the circuit of Fig. 2 will be described briefly. A third arm of the bridge comprises a potentiometer 12 and a fourth arm includes a control element, such as a temperature sensing element 14. The element 12 is a manual adjustment for desired temperature. The power is supplied to two diagonally opposite corners of the bridge from terminals 16. The other two diagonal corners are connected by leads 18 to an amplifier 20 which may be of any suitable form operating through suitable relays to control the operation of an actuator motor 22. The motor may be energized through either of its field coils 24 and 26 to operate the motor in either direction, whereby either hot or cold air may be supplied to the space which is being controlled.

Leads 30 and 32 lead respectively to the thermal elements 8 and 10 whereby one or the other of said elements is energized to supply heat to its corresponding thermistor. The thermal elements 8 and 10 are connected to a common ground.

Assuming that the temperature in the space to be controlled changes by sufficient amount to affect the sensing element 14 to unbalance the bridge (e. g. through a fall in temperature), a signal is sent to the amplifier through the leads 18 whereby the motor is operated in one direction to supply additional heat to the space being controlled. At the same time one of the leads 30 or 32 is energized through the amplifier to supply heating current whereby one thermistor or the other of 4 and 6 is heated, thereby changing its resistance until a rebalance of the bridge is effected, whereupon the actuator motor 22 is stopped. This system of operation is well known and need not be further described.

According to the present invention, the four elements 4, 6, 8 and 10 are mounted closely together and side-by-side as shown in Fig. 1. (Although the present invention does not depend on the particular size of the units, it may be noted that in actual use the device is usually much smaller than shown in Fig. 1, which is drawn to a greatly enlarged scale.) The assembly is described in detail as follows: A stud or bolt 34 has the four elements mounted thereon, the stud being supplied with a suitable bushing or sleeve of insulating material. A washer 36 lies against the head of the stud, then follow in order an insulating washer 38, a terminal plate 40, thermal element 8, a terminal plate 42, an insulating separator 44, a terminal plate 46, the thermistor 4, a common terminal plate 48, the thermistor 6 with its terminal plate 50, an insulating separator 52, a terminal plate 54, the thermal element 10, a terminal plate 56, an insulating separator 58, and finally a washer 60. The four elements are held securely together by a coil spring 62 secured by a suitable nut on the stud 34. It will be noted that the terminal plate 48 is of metal since it forms one of the corners of the bridge, and hence serves as a good heat conductor between the elements 4 and 6.

Figure 2:
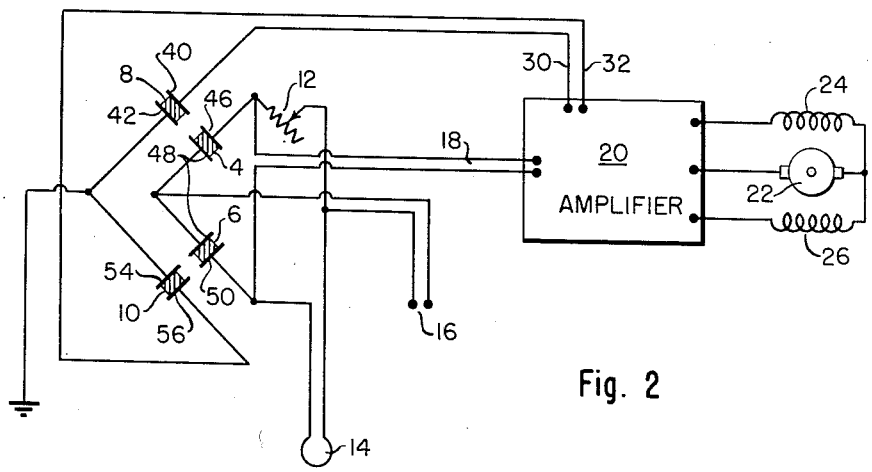
Fig. 2 is a diagram showing the manner of connection of the assembly.

The connections are made from the terminal plates to six studs whereby the external connections shown in Fig. 2 may be made in a manner which will be understood by those skilled in the art.

The construction thus described does not affect the rebalance time, but it shortens the entire time of the pulse or cycle through the capacity for heat conduction between the thermistors 4 and 6 whereby the effective cool-off period is shortened. Thus, the bridge being rebalanced by the flow of heat from, say, thermal element 8 to thermistor 4, heat flows from thermistor 4 into thermistor 6, thereby effecting a rapid equalization of the temperatures of thermistors 4 and 6. During this process heat will radiate from both thermistors 4 and 6. However the "cool off" period is now completed when the elements 4 and 6 are at substantially the same temperature or when their temperature difference is less than that to effect unbalance of the bridge. A new pulse may start when this condition is reached. In the example chosen, it is unnecessary to wait until thermistor 4 cools down to the original temperature of thermistor 6, since the bringing of the two thermistors toward a thermal equilibrium has the same effect as reducing the cool-off period of the cycle, and hence the over-all time constant of the system is reduced.

Having thus described the invention, I claim:

1. A balancing unit for a bridge comprising two temperature-sensitive resistance elements, a thermal element for each of the temperature-sensitive resistance elements and in heat conducting relation thereto, and means for mounting the elements whereby the two temperature-sensitive elements are in direct thermal conductive relation with each other to cause rapid establishment of thermal equilibrium between said temperature-sensitive resistance elements.

2. A balancing unit for a bridge comprising two temperature-sensitive resistance elements, a thermal element for each of the temperature-sensitive resistance elements and in heat conducting relation thereto, and means for mounting the four elements side-by-side with the two temperature-sensitive elements immediately adjacent and in direct heat-conducting relationship to cause rapid establishment of thermal equilibrium between said temperature-sensitive resistance elements.

3. A balancing unit for a bridge comprising two temperature-sensitive resistance elements, a thermal element for each of the temperature-sensitive resistance elements and in heat conducting relation thereto, and means for mounting the four elements side-by-side with the two temperature-sensitive elements immediately adjacent, a plate of electrically and thermally conductive material between the temperature-sensitive elements and engaged on opposite sides by said elements, whereby rapid establishment of thermal equilibrium between said temperature-sensitive elements is effected.

4. A balancing unit for a bridge comprising two temperature-sensitive resistance elements, a thermal element for each of the temperature-sensitive resistance elements and in heat conducting relation thereto, means for mounting the elements in the order of: a thermal element, the two temperature-sensitive elements, and the other thermal element, each thermal element being separated from its adjacent temperature-sensitive element by insulating material, and a conducting plate between the two temperature-sensitive elements, whereby rapid establishment of thermal equilibrium between said temperature-sensitive elements is effected.

5. A balancing unit for a bridge comprising four thermistors, means for mounting the thermistors in side-by-side heat conducting relationship, a central terminal plate between the two inside thermistors, and electrical insulation between each outside thermistor and its adjacent thermistor.

References Cited in the file of this patent
UNITED STATES PATENTS
2,666,889    Ehret et al. _____ Jan. 19, 1954